(12) United States Patent
Annampedu et al.

(10) Patent No.: US 8,902,959 B2
(45) Date of Patent: Dec. 2, 2014

(54) SYSTEM AND METHOD FOR DETERMINING CHANNEL LOSS IN A DISPERSIVE COMMUNICATION CHANNEL AT THE NYQUIST FREQUENCY

(71) Applicant: LSI Corporation, San Jose, CA (US)

(72) Inventors: Viswanath Annampedu, Schnecksville, PA (US); Amaresh V. Malipatil, San Jose, CA (US); Adam B. Healey, Newburyport, MA (US)

(73) Assignee: LSI Corporation, San Jose, CA (US)

( * ) Notice: Subject to any disclaimer, the term of this patent is extended or adjusted under 35 U.S.C. 154(b) by 83 days.

(21) Appl. No.: 13/745,363

(22) Filed: Jan. 18, 2013

(65) Prior Publication Data

US 2014/0204987 A1    Jul. 24, 2014

(51) Int. Cl.
*H04B 3/46*     (2006.01)
*H04L 1/20*     (2006.01)
*H04B 17/00*    (2006.01)

(52) U.S. Cl.
CPC ............. *H04L 1/20* (2013.01); *H04B 17/005* (2013.01); *H04B 17/0055* (2013.01)
USPC .......................................................... 375/224

(58) Field of Classification Search
USPC ................. 375/224, 227, 230–231, 316, 350
See application file for complete search history.

(56) References Cited

U.S. PATENT DOCUMENTS

| 5,621,769 | A  | * | 4/1997  | Wan et al. ................. 375/347 |
| 7,450,668 | B2 | * | 11/2008 | Ghosh et al. ............... 375/341 |
| 8,090,037 | B1 | * | 1/2012  | Harris et al. ............... 375/260 |
| 2006/0171489 | A1 | * | 8/2006 | Ghosh et al. ............... 375/341 |
| 2008/0226000 | A1 | * | 9/2008 | Meyer ......................... 375/347 |

OTHER PUBLICATIONS

Vareljian, Albert, et al., "Performance vs. Complexity and Line Code Proposal", IEEE draft, vol. 802.3, Apr. 5, 2004, 7 pages.
Ganzerli, Marcello, et al., "An Inductor-less 13.5 Gbps 8-mW Analog Equalizer for Multi-Channel Multi-Frequency Operation", IEEE, 2011, pp. 189-192.

* cited by examiner

*Primary Examiner* — Khanh C Tran
(74) *Attorney, Agent, or Firm* — Suiter Swantz pc llo (57) ABSTRACT

The present invention includes receiving a signal from an output of a dispersive communication channel established between a transmitter and a receiver, determining normalized Nyquist energy of the signal transmitted along the dispersive communication channel established between the transmitter and the receiver, and generating a mapping table configured to identify peaking value at or above a selected tolerance level at or near the Nyquist frequency for a signal received by the receiver based on the normalized Nyquist energy.

20 Claims, 5 Drawing Sheets

SYSTEM AND METHOD FOR DETERMINING CHANNEL LOSS IN A DISPERSIVE COMMUNICATION CHANNEL AT THE NYQUIST FREQUENCY

TECHNICAL FIELD

The present invention generally relates to digital signal processing, and, in particular, to the determination of channel loss along a communications channel at or near the Nyquist frequency.

BACKGROUND

As demand for improved communication systems continues to increase so too will the demand for systems and components for reducing channel loss along a dispersive communications channel. Typical communications systems include a data source (i.e., transmitter), a communications channel, and a data destination (i.e., receiver). Factors such as inter-symbol interference (ISI) along a dispersive communications channel may lead to the degradation of signal quality at the receiver of the communications system. Dispersive channels with ISI are encountered in many signal processing and communication applications. For example, one such application may include a high speed serial link between a data source and a data destination. These links may be utilized to transfer voice, data and video via lossy communication channels. Lossy communication channels include, but are not limited to, coaxial cable, network back-planes, optical fibres and the like. Data transferred along a lossy may be transferred at ultra-high speeds (e.g., speeds as high as high as 40 Giga Bits Per Seconds (Gbps)).

In a high speed communication link between transmitting and receiving integrated circuit (IC) chips, SerDes (Serializer De-Serializer) cores serialize blocks of parallel data from the transmitting chip, transmit the serialized data over a communication channel and then de-serialize the received data into parallel data suitable for the receiving chip. Due to limited bandwidth of the communication channel, inter-symbol interference is present along the communication channel, which acts to degrade the quality of the signal received by the receiver. Therefore, it is desirable to provide a method and system suitable for mitigating the impact of the channel loss that occurs along the communications channel.

SUMMARY

A method for determining Nyquist loss in one or more dispersive communication channels is disclosed. In one aspect, the method includes, but is not limited to, providing a transmitter and a receiver. In another aspect, the method includes determining normalized energy content at the Nyquist frequency of a signal transmitted along a dispersive communication channel established between the transmitter and the receiver. In an additional aspect, the method includes generating a mapping table configured to identify a peaking value at or above a selected tolerance level at or near the Nyquist frequency for a signal received by the receiver based on the normalized energy content at the Nyquist frequency.

A system for determining Nyquist loss in one or more dispersive communication channels is disclosed. In one aspect, the system includes, but is not limited to, a transmitter and a receiver. In another aspect, the system includes an energy calculator configured to determine normalized energy content at the Nyquist frequency of a signal transmitted along a dispersive communication channel established between the transmitter and the receiver. In another aspect, the system includes a mapping table generator configured to identify a peaking value at or above a selected tolerance level at or near the Nyquist frequency for a signal received by the receiver based on the normalized energy content at the Nyquist frequency from the energy calculator.

A non-transitory computer readable medium storing computer executable instructions which, when executed by one or more processors, cause the one or more processors to carry out a method for determining Nyquist loss in one or more dispersive communication channels is disclosed. In one aspect, the method includes, but is not limited to, receiving a signal from an output of a dispersive communication channel established between a transmitter and a receiver. In another aspect, the method includes determining normalized energy content at the Nyquist frequency of the signal transmitted along the dispersive communication channel established between the transmitter and the receiver. In another aspect, the method includes generating a mapping table configured to identify a peaking value at or above a selected tolerance level at or near the Nyquist frequency for a signal received by the receiver based on the normalized energy content at the Nyquist frequency.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIGS. 1A-1D, a system for determining channel loss at the Nyquist frequency is described, in accordance with the present invention. It is noted herein that channel loss at the Nyquist frequency (i.e., half of the sampling frequency) along a dispersive communication channel may serve as an indicator of degradation in signal quality. It is further noted herein that advanced signal shaping equalizer filters may be utilized to decode a signal transmitted along a communication channel at the receiver. In the design of adequate equalizer filters, knowledge of the level of loss experienced along a communication channel at the Nyquist frequency is useful. To compensate for the channel loss, signal peaking (i.e., amplification) is provided around the Nyquist frequency utilizing an equalizer. For the purposes of the present disclosure, the term "channel loss" represents the absorption loss experienced by a signal transmitted along the communication channel 108. In addition, for the purposes of the present disclosure, the term "Nyquist channel loss" represents the absorption loss at the Nyquist frequency experienced by a signal transmitted along the communication channel 108.

The present invention is directed to a process and architecture suitable for determining or estimating normalized energy or energy loss at or near the Nyquist frequency (i.e., measurement of channel loss at Nyquist frequency) of the signal received by a receiver from an output of a communications channel. In another aspect, the present invention is directed to controlling or programming an equalizer in order to provide signal peaking at or above a selected tolerance level (e.g., signal peaking sufficient for operation of data link, optimal signal peaking, or near optimal signal peaking) at or near the Nyquist frequency based on the determined normalized energy at the Nyquist frequency. In a further aspect, the present invention is directed to the compensation of environmental variations based on the measured signal loss at or near the Nyquist frequency.

Figure 1A:
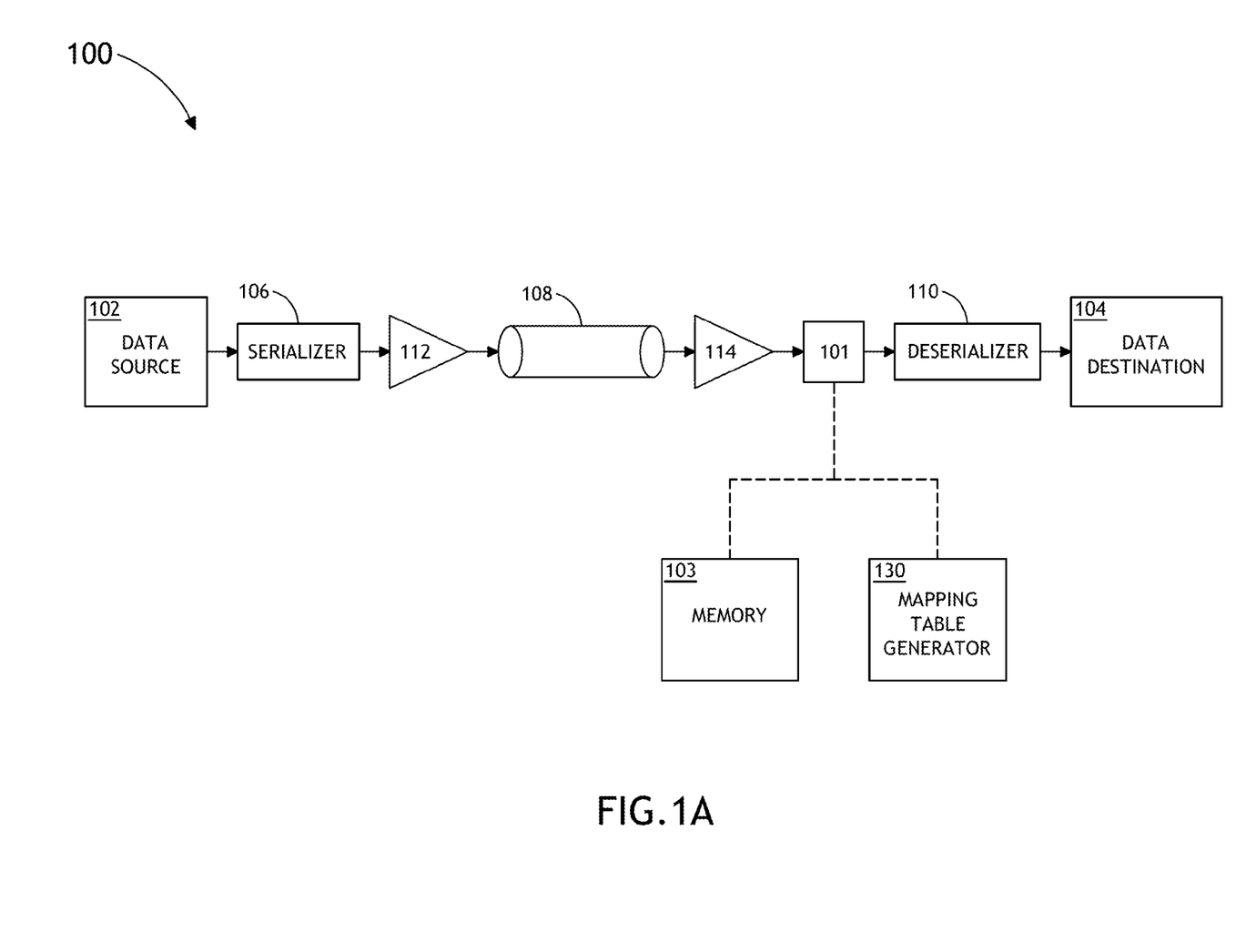
FIG. 1A illustrates a block diagram view of a communication system equipped with an energy calculator for determining channel loss at the Nyquist frequency in one or more dispersive communication channels, in accordance with one embodiment of the present invention.

FIG. 1A illustrates a block diagram view of a communications system 100 equipped with an energy calculator 101 for determining channel loss at the Nyquist frequency in one or more dispersive communication channels, in accordance with one embodiment of the present invention.

In one embodiment, the system 100 includes, but is not limited to, a serializer 106, a transmitter 112, a receiver 114, and a deserializer 110. In this regard, input data from a data source 102 (e.g., integrated circuit (IC) Chip 1) is received by the serializer 106. In one embodiment, the serializer 106 generates a serial bit-stream by serializing parallel blocks of data from the data source 102. In another embodiment, the serialized bit-stream is inputted into the transmitter 112. In another embodiment, the serial bit-stream is transmitted from the transmitter 112 to the receiver 114 via the communication channel 108. In one embodiment, the communication channel includes one or more transmission lines (e.g., wire, printed circuit board trace, optical fiber, and the like). In another embodiment, the serialized signal received by the receiver 114 is transmitted to the deserializer 110, whereby the deserializer 110 converts the serial data into parallel blocks suitable for use by the data destination 104 (e.g., IC Chip 2). High speed data links are described in detail in P. M. Aziz and A. V. Malipatil, *Adaptation Algorithms for a Class of Continuous Time Analog Equalizers With Application to Serial Links*, IEEE Proceedings of the ISCAS, pp. 1383-1386, which is incorporated herein by reference in the entirety.

In another embodiment, the system 100 may include, but is not limited to, an energy calculator 101 configured to calculate the energy content of the signal at the receiver 114. In this regard, the energy calculator 101 may determine the energy loss of the signal along the communication channel 108. In another embodiment, the energy calculator 101 is configured to determine the energy loss of the transmitted signal along the communication channel 108 (e.g., dispersive communication channel with inter-symbol interference) at or near the Nyquist frequency (i.e., half the sampling frequency). In a further embodiment, the energy calculator 101 is configured to calculate the normalized energy loss along the communication channel 108 at or near the Nyquist frequency. It is noted herein that a measurement of the normalized Nyquist channel loss of a signal, with respect to the signal's low frequency content, with the energy calculator 101, aids in eliminating adverse effects caused by arbitrary transmitted signal amplitudes in the signal transmitted from the transmitter 112 to the receiver 114.

In one embodiment, the system 100 may further include a non-transitory storage medium (i.e., memory medium) containing program instructions configured to cause one or more processors of the system 100 to carry out the various steps described throughout the present disclosure. Program instructions implementing methods such as those described herein may be transmitted over or stored on a carrier medium. The carrier medium may be a transmission medium such as a wire, cable, or wireless transmission link. The carrier medium may also include a memory medium such as a read-only memory, a random access memory, a magnetic or optical disk, or a magnetic tape. In general, the term "processor" may be broadly defined to encompass any device having one or more processors, which execute instructions from a memory medium. In this sense, the one or more processors may include any microprocessor-type device configured to execute software algorithms and/or instructions. In one embodiment, the one or more processors may consist of a desktop computer or other computer system (e.g., networked computer) configured to execute a program configured to operate one or more components of the system 100, as described throughout the present disclosure. It should be recognized that the steps described throughout the present disclosure may be carried out by a single computer system or, alternatively, multiple computer systems. In another embodiment, the results of the energy content calculation carried out by the energy calculator 101 may be transmitted to and stored in one or more memory medium 103. In a further embodiment, as will be discussed in greater detail further herein, the system 100 may access the stored energy calculation results to attain the peaking value above a selected tolerance level (e.g., optimal peaking value or peaking value sufficient for data link operation) at or near the Nyquist frequency.

Figure 1B:
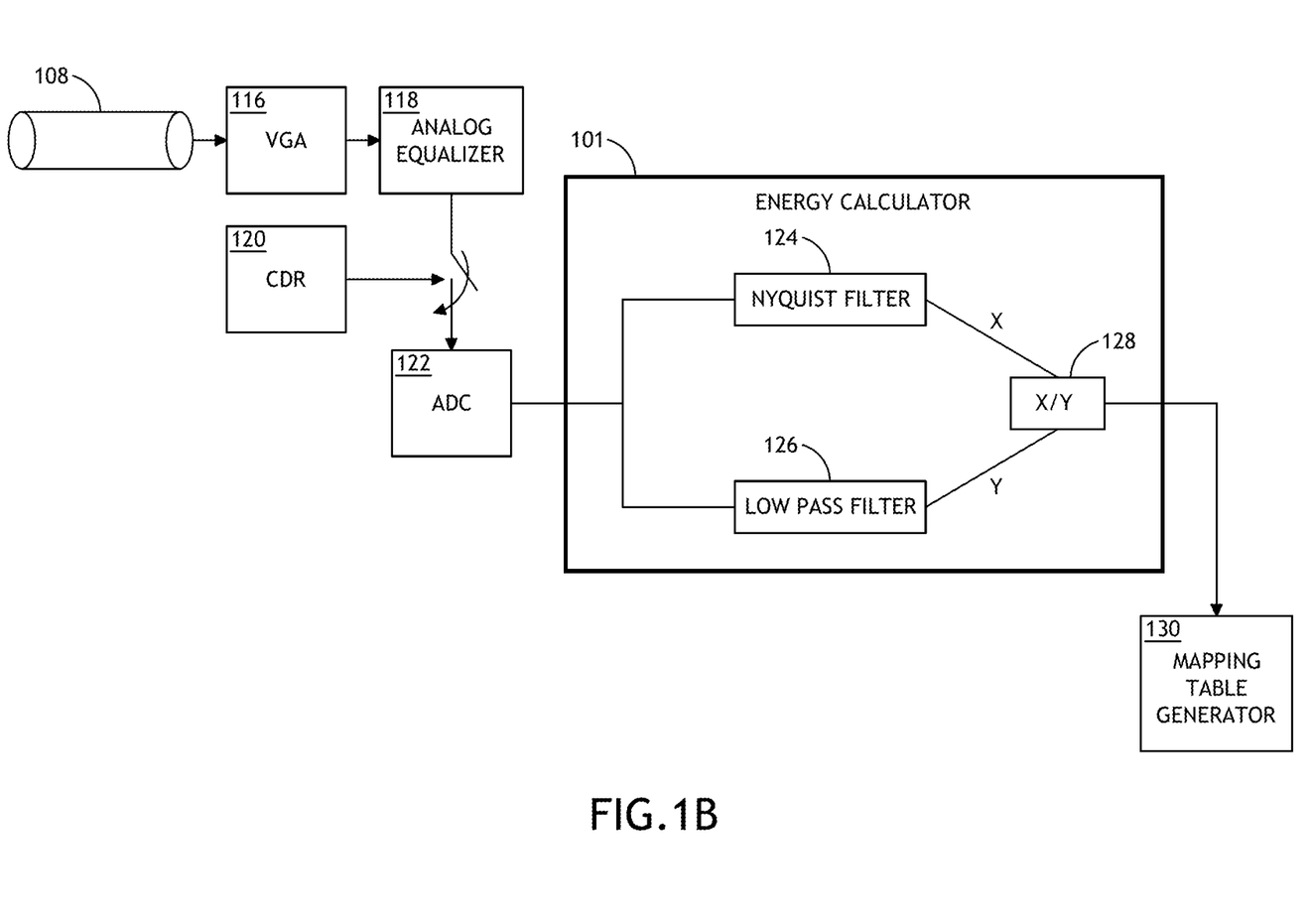
FIG. 1B illustrates a block diagram view of a communication system depicting the determination of the normalized energy content of a signal at or near the Nyquist frequency with an energy calculator, in accordance with an embodiment of the present invention.

FIG. 1B illustrates a block diagram view of system 100 depicting the determination of the normalized energy content of a signal at or near the Nyquist frequency with energy calculator 101, in accordance with an embodiment of the present invention. In one embodiment, upon being transmitted along the communication channel 108, the signal is processed by one or more variable gain amplifiers (VGA) 116. It is recognized herein that processing by the VGA aids the signal received by the receiver 114 to achieve the full dynamic range of the analog-to-digital converter (ADC) 122, thereby reducing quantization effects. In another embodiment, the VGA 116 output is processed by an analog linear equalizer 118. It is noted herein that the equalizer 118 is configured to shape (i.e., equalize) the received signal in order to reduce inter-symbol interference (ISI) present in the received signal providing improved signal detection.

In another embodiment, the signal content of the received signal at or near the Nyquist frequency is amplified by the equalizer 118. It is recognized herein that the amount of peaking (i.e., amplification) required to adequately shape the signal may depend on the signal content at the Nyquist frequency. It is further noted herein that the amount of peaking required is generally a function of the amount of signal attenuation by the communication channel 108 at the Nyquist frequency. In this regard, signals that experience significant attenuation by the communication channel 108 at the Nyquist frequency require more peaking than signals that experience less attenuation at the Nyquist frequency.

In another embodiment, the output of the equalizer 118 is sampled by a clock of the clock-data-recovery (CDR) circuit 120. In turn, the output of the equalizer is digitized by the ADC 122 for further signal processing.

In another embodiment, the energy calculator 101 determines (or at least estimates) the signal content at the Nyquist frequency by sampling the output of the ADC 122. In one embodiment, the energy calculator 101 includes a Nyquist filter 124 and a low pass filter 126. In another embodiment, signal samples from the ADC 122 are passed through the Nyquist filter 124 and the low pass filter 126. In one embodiment, the Nyquist filter 124 consists of a band pass filter at or near the Nyquist frequency. In one embodiment, the Nyquist filter 124 may be represented as follows:

$$\text{Nyquist Filter} = 1 + D - D^2 + D^3 - \quad \text{(Eq. 1)}$$

In another embodiment, the low pass filter 126 may be represented as follows:

$$\text{Low Pass Filter} = 1 + D + D^2 + D^3 + \quad \text{(Eq. 2)}$$

In another embodiment, the Nyquist energy of the signal is calculated as the sum of the squares of the signal samples at the output of the Nyquist filter 124. As shown in FIG. 1B, the Nyquist energy is represented by "X." In an additional embodiment, the low pass frequency content of the signal is calculated as the sum of the squares of the samples at the output of the low pass filter 126. As shown in FIG. 1B, the low pass frequency content of the signal is represented by "Y."

In another embodiment, the energy calculator 101 includes a normalizer 128 configured to determine the normalized energy content at the Nyquist frequency in the received signal. In one embodiment, the normalizer 128 calculates the ratio between the Nyquist filter output X of the signal and the low pass filter output Y of the signal. In this regard, the calculated ratio between X and Y provides the normalized energy content at the Nyquist frequency of the received signal. It is noted herein that the division of the Nyquist filter output X by the low pass filter output Y aids in normalizing the energy calculation against any arbitrary transmit signal amplitude present at the receiver input. In an alternative embodiment, as a simplification, rather than utilizing a sum of squares to determine the outputs (i.e., X and Y) of the Nyquist filter 124 and the low pass filter 126, a sum of absolute magnitudes may be implemented to calculate the Nyquist filter 124 output X and the low pass filter 126 output Y.

In another embodiment, the energy calculator 101 transmits one or more signals indicative of the energy determination to a mapping table generator 130. In another embodiment, the energy calculator 101 transmits one or more signals indicative of the energy determination to the memory medium 103 for storage and future utilization. In this regard, the mapping table generator 130 or other subsystems may retrieve the energy determination from the memory medium 103.

Figure 1C:
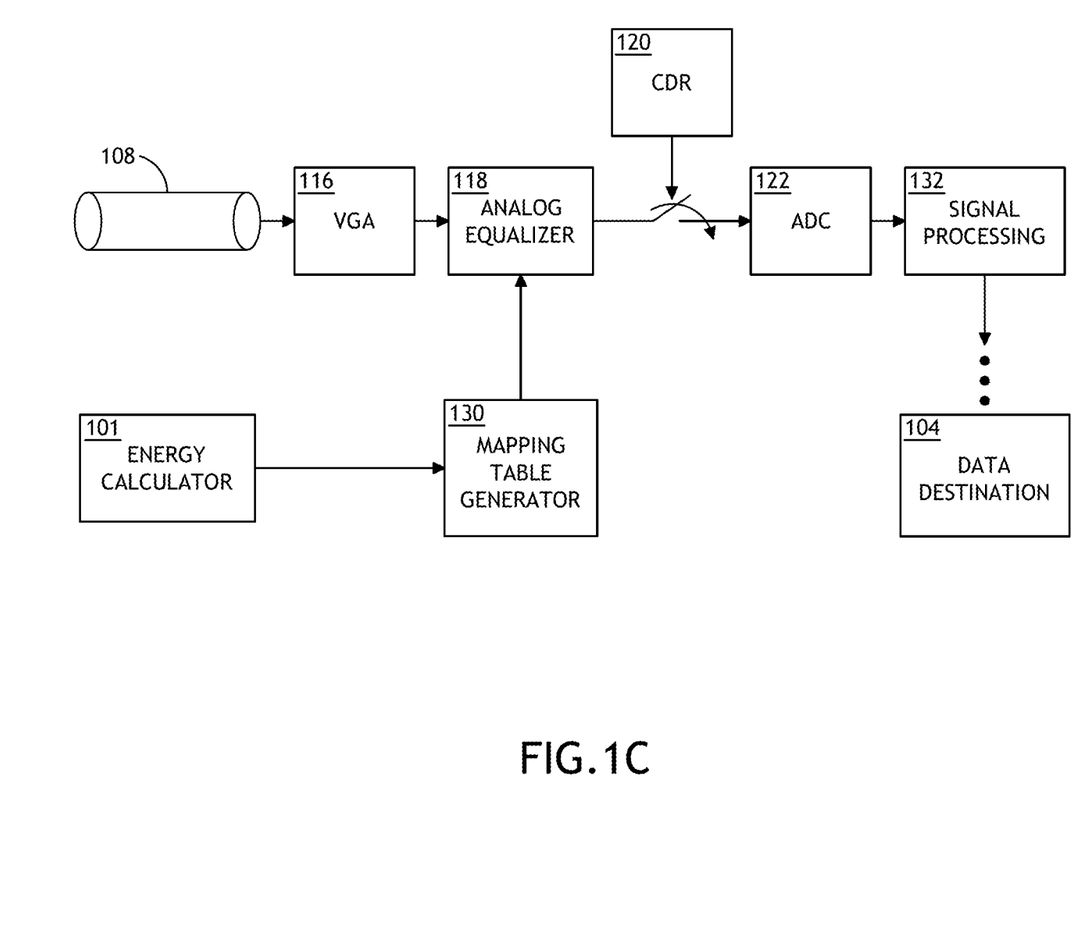
FIG. 1C illustrates a block diagram view of a communication system depicting a mapping table generator and programming of an equalizer, in accordance with an embodiment of the present invention.

FIG. 1C illustrates a block diagram view of system 100 depicting the mapping table generator 130 and the programming of the equalizer 118, in accordance with an embodiment of the present invention. In one embodiment, a mapping generator 130 is configure to map the signal energy at the Nyquist frequency measured by the energy calculator 101 to the set of equalizer conditions needed to achieve an acceptable (e.g., optimal peaking value or peaking value sufficient for operation of data link) peaking value at the Nyquist frequency. In another embodiment, the mapping generator 130 is configured to execute one or more simulations in order to generate a mapping table suitable for mapping the Nyquist signal energy measured by the energy calculator 101 to the set of equalizer conditions needed to achieve an acceptable (e.g., optimal peaking value or peaking value sufficient for operation of data link) peaking value at the Nyquist frequency. In another embodiment, a series of hardware experiments may be carried out to generate a mapping table suitable for mapping the Nyquist signal energy measured by the energy calculator 101 to the set of equalizer conditions needed to achieve an acceptable (e.g., optimal peaking value or peaking value sufficient for operation of data link) peaking value at the Nyquist frequency. In another embodiment, the analog equalizer 118 is programmed using the generated mapping table from the mapping table generator 130.

Figure 1D:
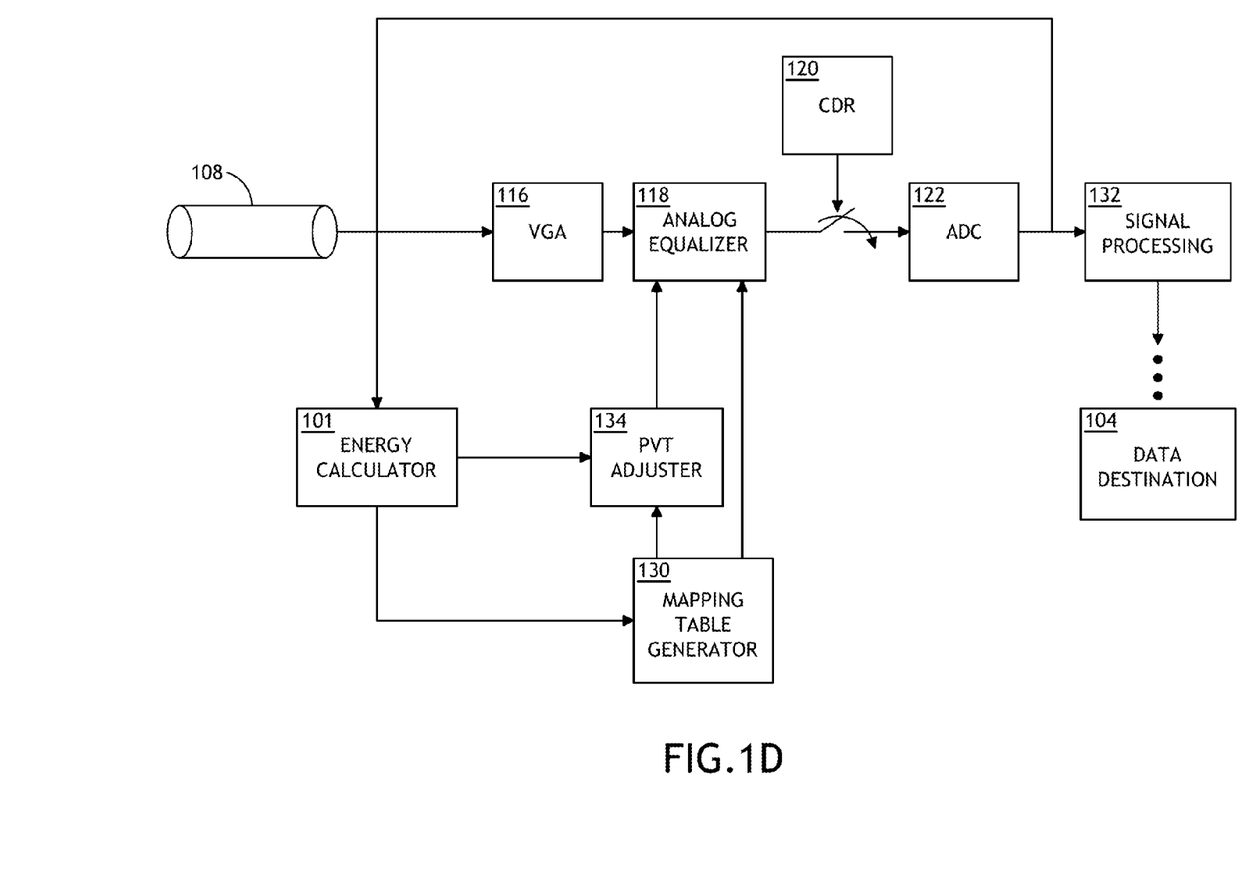
FIG. 1D illustrates a block diagram view of a communication system depicting a PVT adjuster configured to compensate an equalizer signal for environmental variations, in accordance with an embodiment of the present invention.

FIG. 1D illustrates a block diagram view of a communication system depicting a PVT adjuster 134 configured to compensate an equalizer signal for environmental variations, in accordance with an embodiment of the present invention. In one embodiment, the PVT adjuster 134 is configured to compensate an equalizer signal controlled by the mapping table generator 130, as described previously herein.

In one embodiment, following the programming of the equalizer 118 (as described previously herein), the energy content of a signal at the Nyquist energy is re-measured by the energy calculator 101 and deviations from the acceptable peaking (e.g., optimal peaking value or peaking value sufficient for operation of data link) are identified. In another embodiment, the PVT adjuster 134 adjusts the equalizer 118 (e.g., re-programs the equalizer) to compensate for the identified peaking deviation(s). In another embodiment, the PVT adjustment by the PVT adjuster 134 may be carried out any number of times until the desired level of signal peaking tolerance is achieved. In one embodiment, the deviations from the desired peaking are imparted due to PVT variations in the system 100. In some embodiments, the PVT variations include, but are not limited to, process variations, voltage variations, or temperature variations.

By way of example, in a setting where the initial signal loss at the Nyquist frequency is measured at 40 dB and the peaking needed to reach an acceptable peaking level is 20 dB, the equalizer 118 is initially programmed by the mapping table generator 130 (or a controller thereof (not shown)) for 20 dB. Further, in a setting where PVT variations cause a 2 dB shortfall in the imparted peaking by the equalizer the initial peaking is only 18 dB. In this example, upon remeasuring the energy content at the Nyquist frequency, the system 100 will identify a 22 dB loss. In this example, the PVT adjuster circuit 134 may program, or re-program, the equalizer 118 to provide an additional 2 dB of peaking in order to compensate for the experienced and measured PVT variation.

The embodiments of the system 100 illustrated in FIG. 1 may be further configured as described herein. In addition, the system 100 may be configured to perform any other step(s) of any of the method embodiment(s) described herein.

Figure 2:
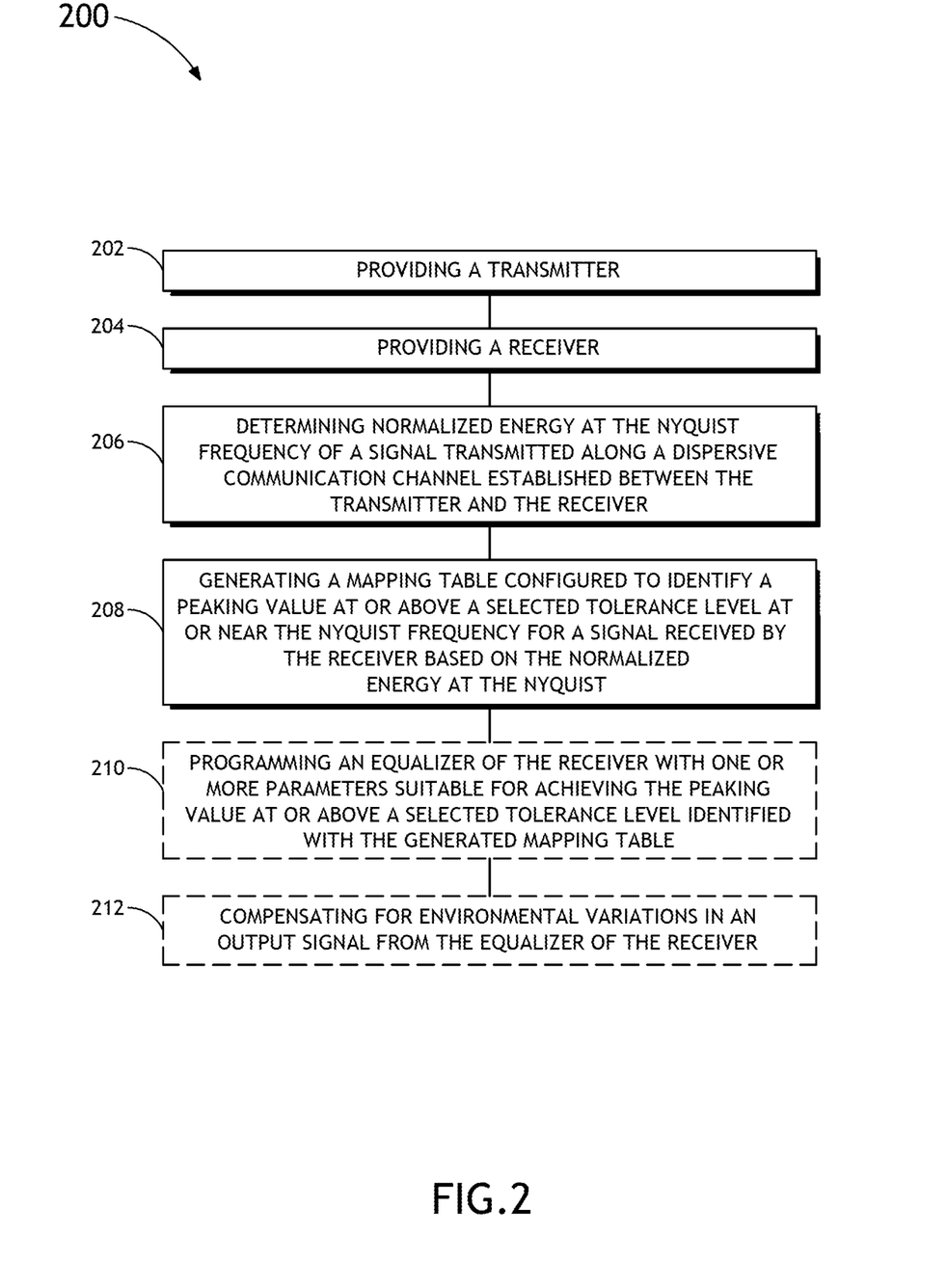
FIG. 2 illustrates a process flow diagram for determining Nyquist loss in one or more dispersive communication channels, in accordance with one embodiment of the present invention.

FIG. 2 illustrates a process flow 200 for determining Nyquist loss in one or more dispersive communication channels, in accordance with one embodiment of the present invention. In step 202, a transmitter is provided. In step 204, a receiver is provided. In step 206, the normalized energy content at the Nyquist frequency of a signal transmitted along a dispersive communication channel established between the transmitter and the receiver is determined (or at least estimated). In step 208, a mapping table configured to identify a peaking value at or above a selected tolerance level (e.g., optimal peaking value or peaking value sufficient for operation of data link) at or near the Nyquist frequency for a signal received by the receiver based on the normalized energy content at the Nyquist frequency is generated. In a further step 210, an equalizer of the receiver is programmed with one or more parameters suitable for achieving the peaking value at or above the selected tolerance level identified with the generated mapping table. In step 212, environmental variations (e.g., process variations, voltage variations, temperature variations, and the like) in an output signal from an equalizer of the receiver are compensated for utilizing the PVT adjuster 134.

Applicant notes that the above ordering of steps should not be interpreted as limiting. It is anticipated that at least a portion of the steps of process 200 may be carried out in a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed:

1. A system for determining channel loss at the Nyquist frequency in one or more dispersive communication channels, comprising:
  a transmitter;
  a receiver;
  an energy calculator configured to determine a normalized energy at the Nyquist frequency of a signal transmitted along a dispersive communication channel established between the transmitter and the receiver; and
  a mapping table generator configured to identify a peaking value at or above a selected tolerance level at or near the Nyquist frequency for a signal received by the receiver based on the normalized energy at the Nyquist frequency from the energy calculator.

2. The system of claim 1, wherein the mapping table generator is further configured to program an equalizer of the receiver with one or more parameters suitable for achieving the peaking value at or above a selected tolerance level determined by the mapping table generator.

3. The system of claim 1, further comprising:
a process, voltage, and temperature (PVT) adjuster configured to compensate for environmental variations in an output signal from the equalizer of the receiver.

4. The system of claim 1, wherein the peaking value at or above a selected tolerance level comprises:
an optimal peaking value.

5. The system of claim 1, wherein the energy calculator includes:
a Nyquist filter; and
a low pass filter.

6. The system of claim 5, wherein the Nyquist filter comprises:
a bandpass filter at substantially the Nyquist frequency.

7. The system of claim 5, wherein the energy calculator includes:
a normalizer configured to determine the normalized energy content at the Nyquist frequency content in the signal received by the receiver from the transmitter.

8. The system of claim 7, wherein the normalizer is configured to calculate a ratio between an output of the Nyquist filter and an output of the low pass filter.

9. The system of claim 1, further comprising:
a memory medium configured to store an output of the energy calculator.

10. A method for determining channel loss at the Nyquist frequency in one or more dispersive communication channels, comprising:
providing a transmitter;
providing a receiver;
determining normalized energy at the Nyquist frequency of a signal transmitted along a dispersive communication channel established between the transmitter and the receiver; and
generating a mapping table configured to identify peaking value at or above a selected tolerance level at or near the Nyquist frequency for a signal received by the receiver based on the normalized energy at the Nyquist frequency.

11. The method of claim 10, further comprising:
compensating for environmental variations in an output signal from an equalizer of the receiver.

12. The method of claim 10, wherein the peaking value at or above a selected tolerance level comprises:
an optimal peaking value.

13. The method of claim 10, wherein the determining normalized energy at the Nyquist frequency of a signal transmitted along a dispersive communication channel established between the transmitter and the receiver comprises:
applying a Nyquist filter to the received signal; and
applying a low pass filter to the received signal.

14. The method of claim 13, wherein the determining normalized energy at the Nyquist frequency of a signal transmitted along a dispersive communication channel established between the transmitter and the receiver comprises:
normalizing the energy content at the Nyquist frequency in the signal received by the receiver from the transmitter.

15. The method of claim 14, wherein the normalizing the energy content at the Nyquist frequency in the signal received by the receiver from the transmitter comprises:
calculating a ratio between an output of the Nyquist filter and an output of the low pass filter.

16. The method of claim 10, further comprising:
programming an equalizer of the receiver with one or more parameters suitable for achieving the peaking value at or above a selected tolerance level identified with the generated mapping table.

17. A non-transitory computer readable medium storing computer executable instructions which, when executed by one or more processors, cause the one or more processors to carry out a method for determining channel loss at the Nyquist frequency in one or more dispersive communication channels, comprising:
receiving a signal from an output of a dispersive communication channel established between a transmitter and a receiver;
determining normalized energy at the Nyquist frequency of a signal transmitted along the dispersive communication channel established between the transmitter and the receiver; and
generating a mapping table configured to identify a peaking value at or above a selected tolerance level at or near the Nyquist frequency for a signal received by the receiver based on the normalized energy at the Nyquist frequency.

18. The non-transitory computer readable medium of claim 17, further comprising:
compensating for environmental variations in an output signal from an equalizer of the receiver.

19. The non-transitory computer readable medium of claim 17, wherein the peaking value at or above a selected tolerance level comprises:
an optimal peaking value.

20. The non-transitory computer readable medium claim 17, further comprising:
programming an equalizer of the receiver with one or more parameters suitable for achieving the peaking value at or above a selected tolerance level identified with the generated mapping table.

* * * * *